United States Patent [19]

Yamaguchi

[11] 4,439,017

[45] Mar. 27, 1984

[54] ZOOM LENS

[75] Inventor: Shin Yamaguchi, Kanagawa, Japan

[73] Assignee: Canon Kabushiki Kaisha, Tokyo, Japan

[21] Appl. No.: 289,175

[22] Filed: Aug. 3, 1981

[30] Foreign Application Priority Data

Aug. 14, 1980 [JP] Japan ................. 55-112210

[51] Int. Cl.³ ..................... G02B 9/64; G02B 15/18
[52] U.S. Cl. ..................... 350/427; 350/423
[58] Field of Search ........................ 350/427

[56] References Cited

U.S. PATENT DOCUMENTS

| | | | |
|---|---|---|---|
| 4,025,167 | 5/1977 | Ikeda | 350/427 |
| 4,189,213 | 2/1980 | Iizuka | 350/423 |
| 4,240,699 | 12/1980 | Sato et al. | 350/423 |
| 4,350,416 | 9/1982 | Iishiyama | 350/427 |

Primary Examiner—John K. Corbin
Assistant Examiner—Rebecca D. Gass
Attorney, Agent, or Firm—Toren, McGeady and Stanger

[57] ABSTRACT

In the compact zoom lens disclosed, a first lens group of positive power includes a negative lens and two positive lenses movable for focusing, a second lens group has a negative refractive power, a positive third lens group has a positive lens and a negative lens, with the image magnification variation being effected by the second and third lens groups, a positive fourth lens group constitutes an image forming section. The relations $$72 < \nu_{23} < 95.1$$
$$1 \times 10^{-3} < (\theta_1 - \theta_{23})/(\nu_{23} - \nu_1) < 2 \times 10^{-3}$$
$$0.9 \times 10^{-3} < (\theta_9 - \theta_8)/(\nu_8 - \nu_9) < 2.3 \times 10^{-3}$$

are satisfied for correcting chromatic aberration in the telephoto position. Here, $\nu_{23}$ is the average value of the Abbe numbers of the two positive lenses in the first lens group $\nu_1$ of the negative lens in the first lens groups, $\theta_{23}$ the average value of the partial dispersion ratios of two positive lenses in the first lens groups, $\theta_1$ the partial dispersion ratio of the negative lens in the first lens group, and $\nu_8$, $\nu_9$, $\theta_8$, and $\theta_9$ the Abbe numbers and partial dispersion ratios of the positive and negative lenses in the third lens group.

2 Claims, 40 Drawing Figures

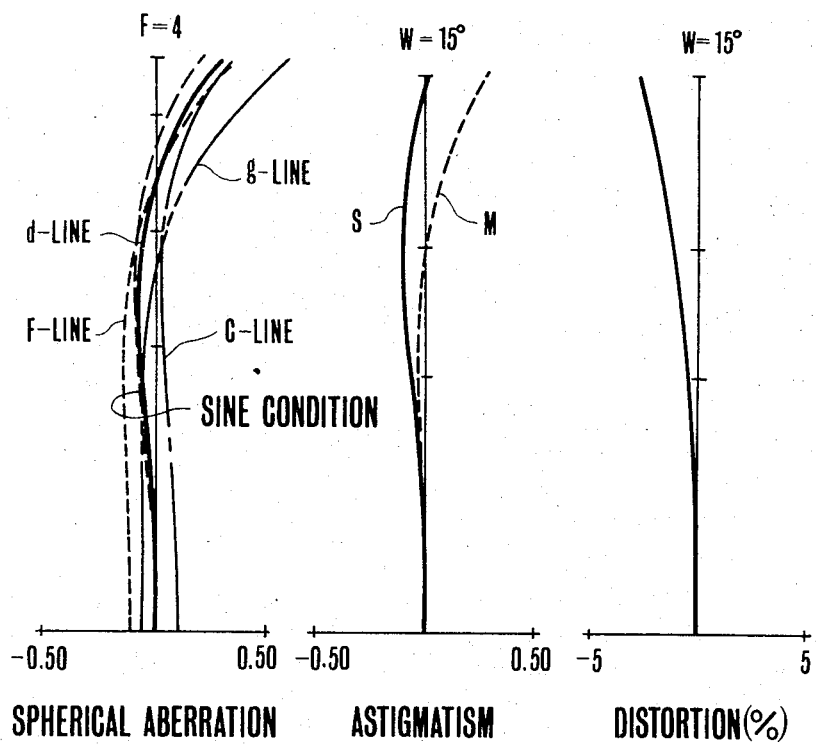

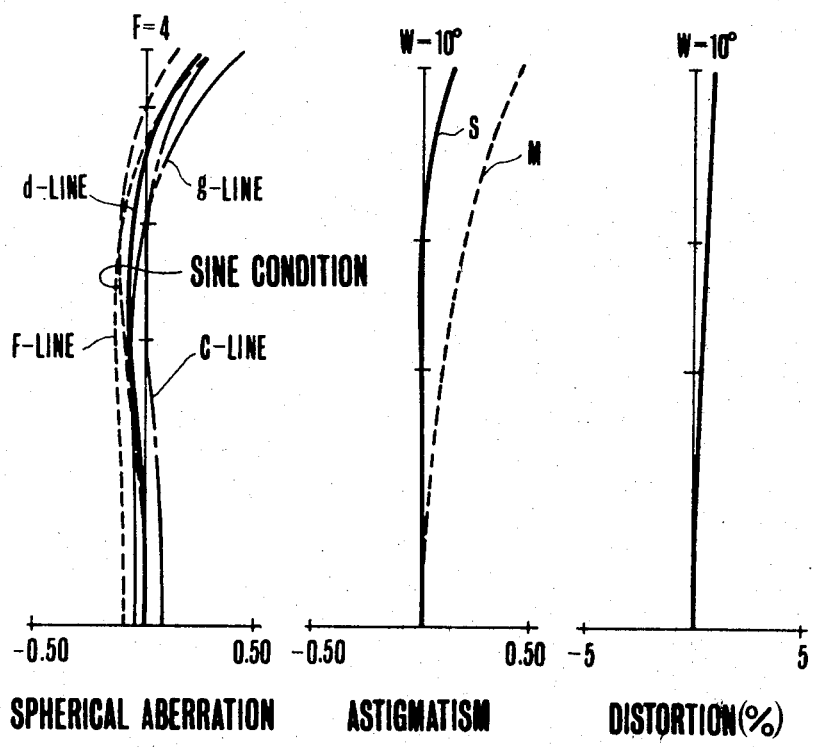

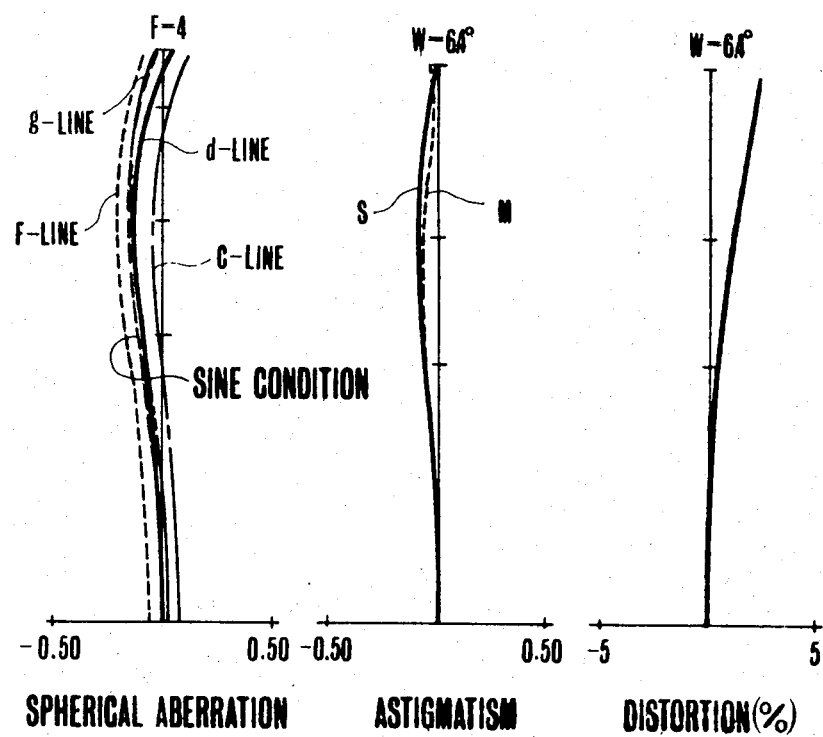

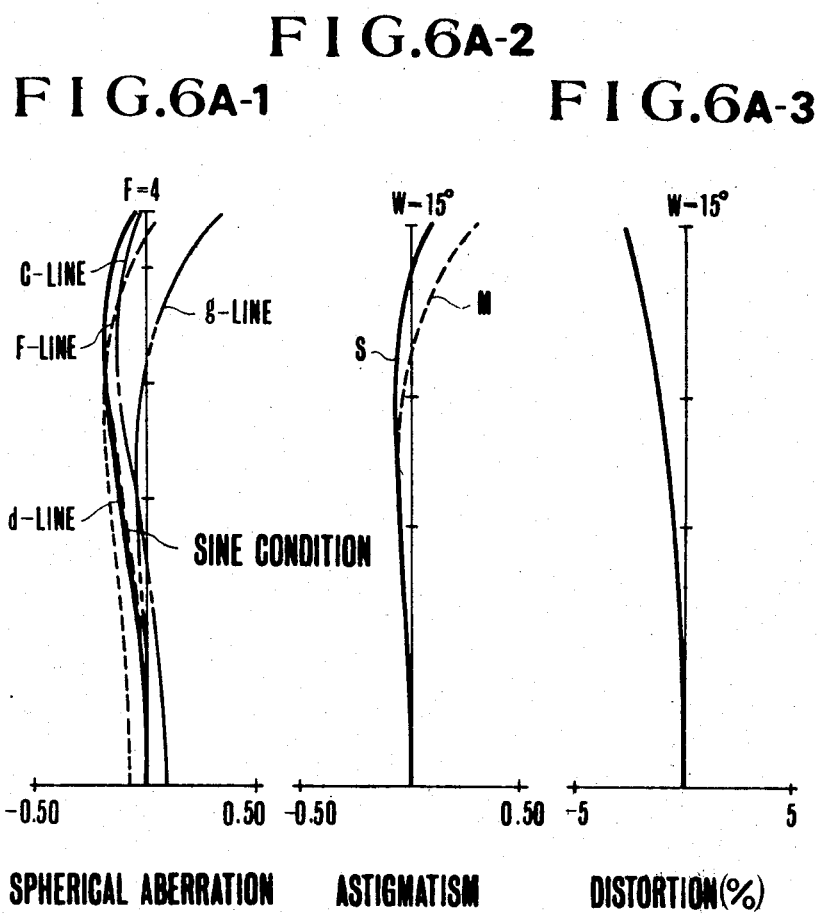

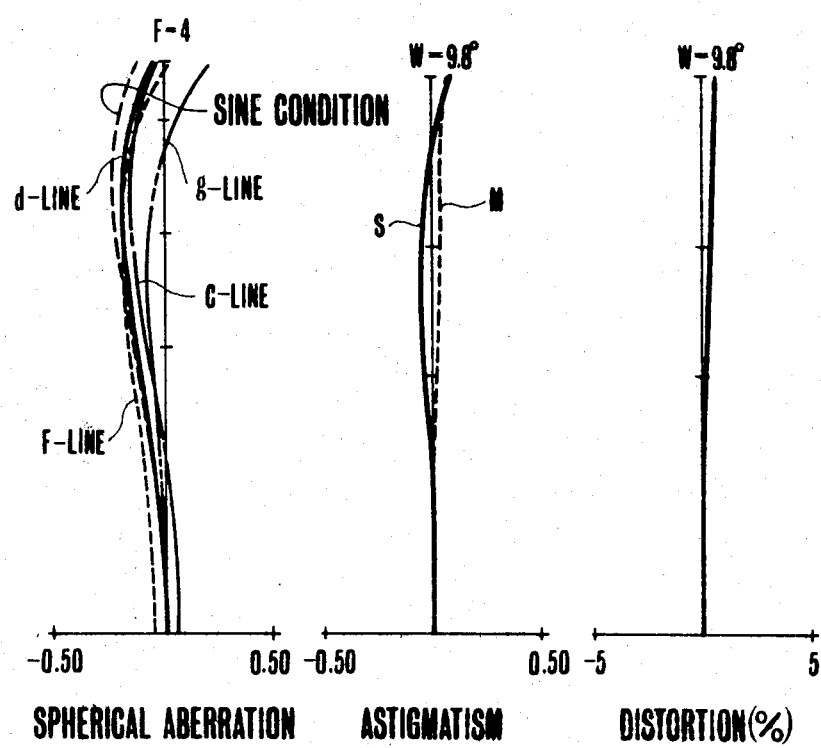

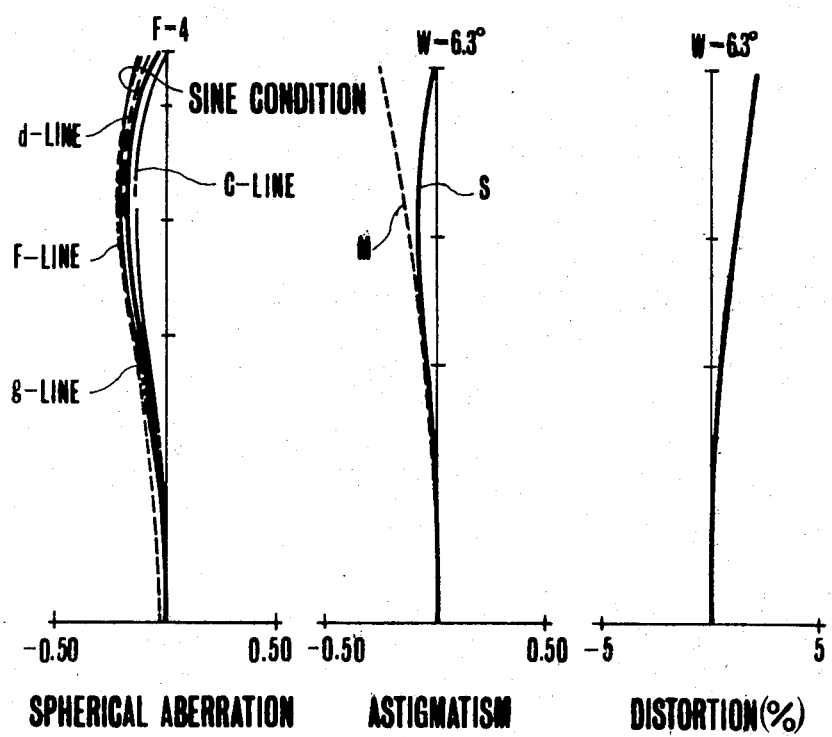

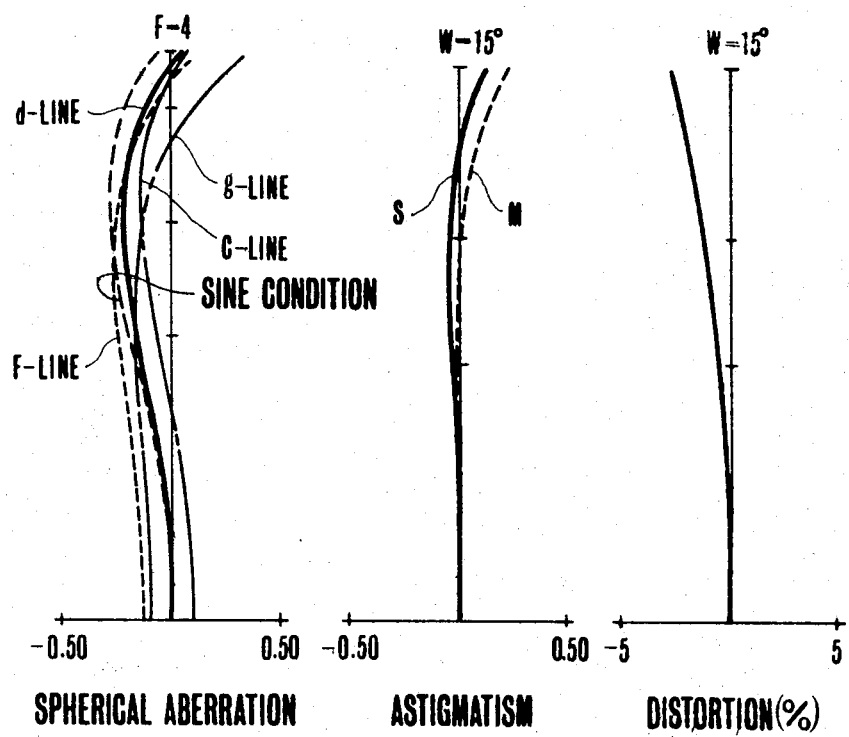

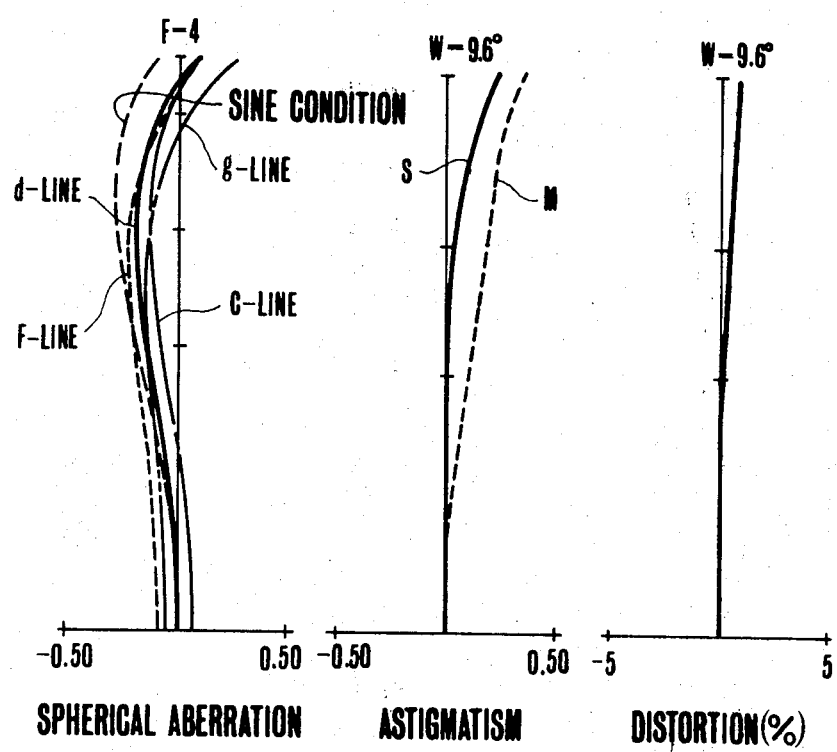

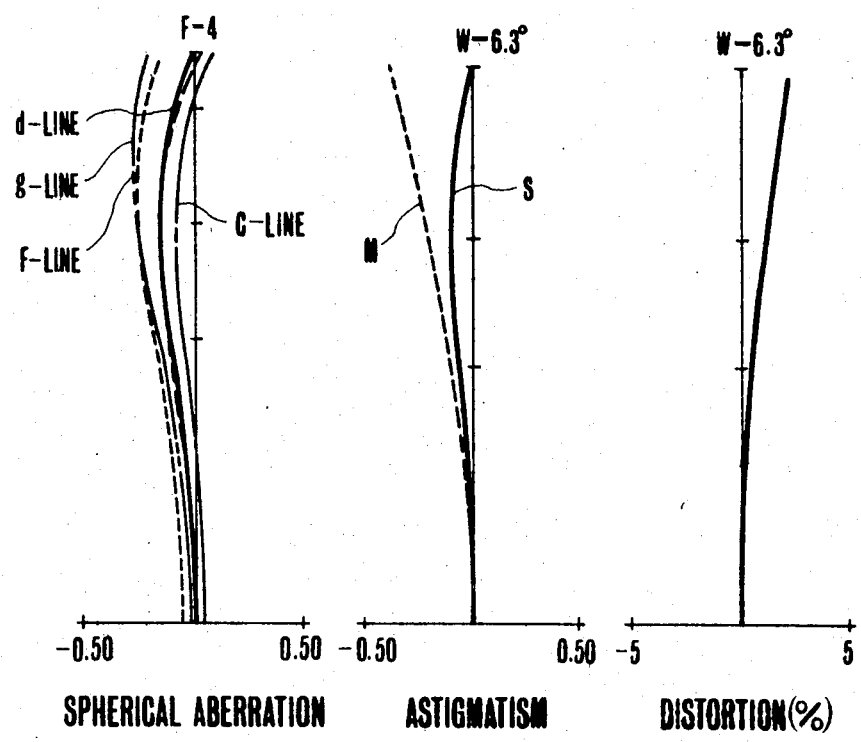

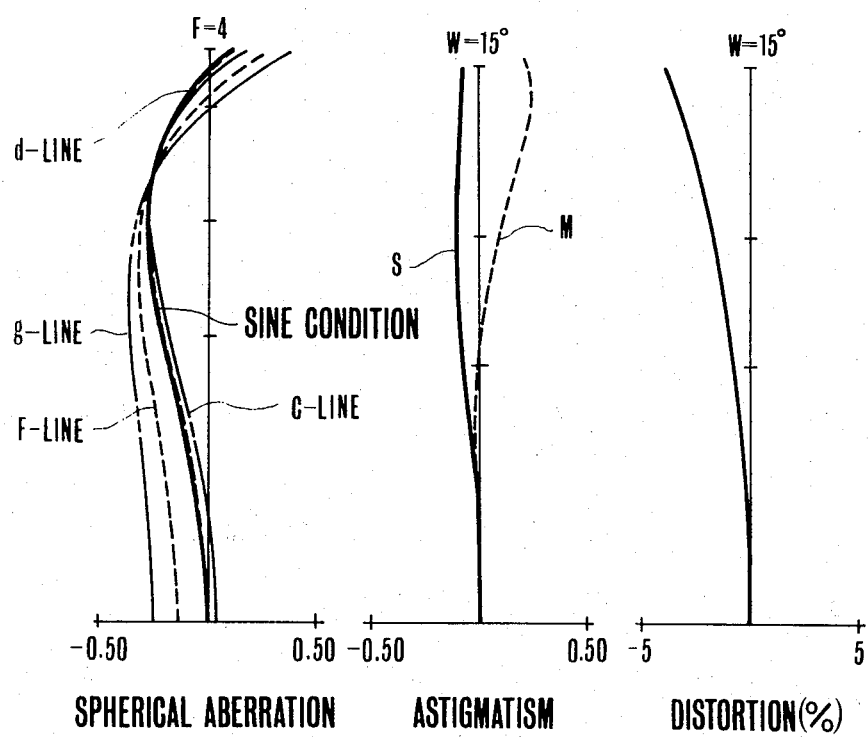

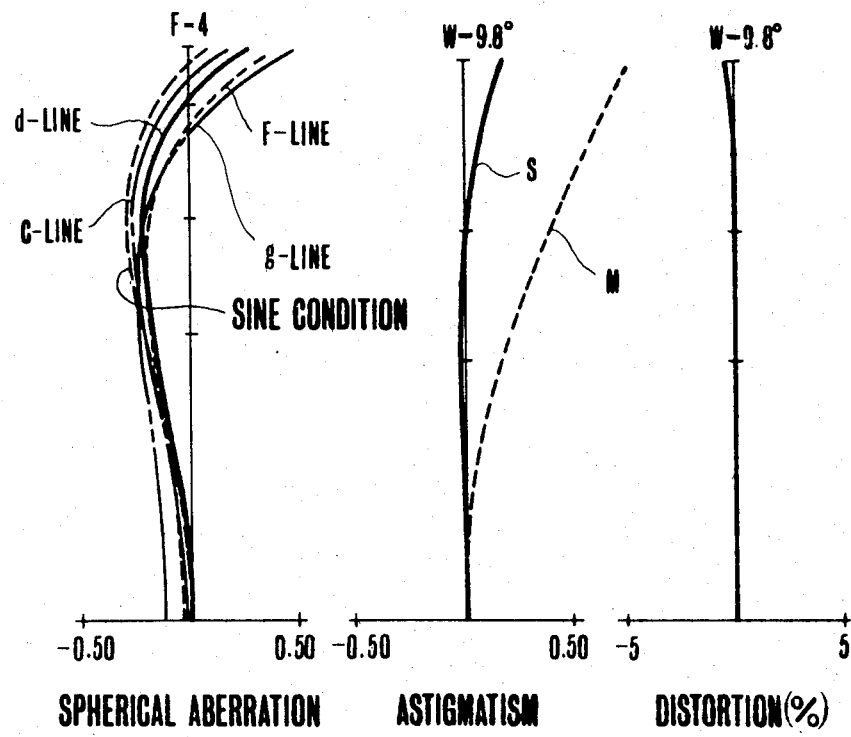

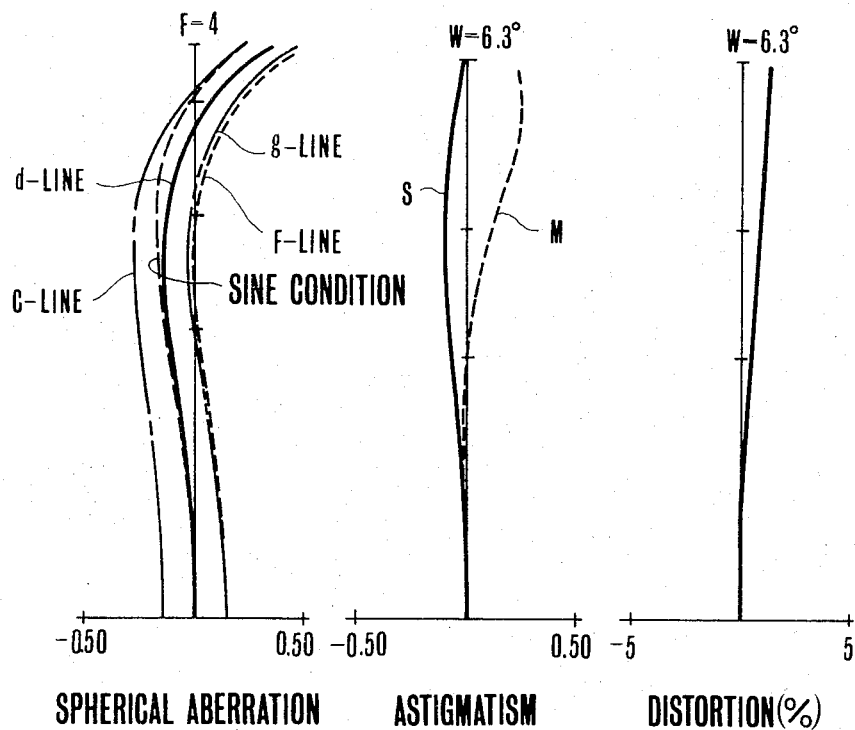

ZOOM LENS

BACKGROUND OF THE INVENTION

1. Field of the Invention

This invention relates to compact photographic zoom lenses with angular fields of 12.5 to 30°, a zoom ratio of 2.5, and an aperture ratio of about F/4.

2. Description of the Prior Art

In general, long focal length photographic zoom lenses often use four lens group of positive, negative, positive, and positive powers in that order, with the first group from the front forming a focusing section, the second and third groups forming a varifocal section, and the fourth group forming an image forming section. This type of zoom lens is operated by moving the second lens group linearly to change the image magnification and simultaneously moving the third lens group non-linearly to compensate for the image shift.

Such zoom lenses require rapid increases in the physical length and the diameter of the front group of the lens system in order to extend the range and increase the aperture ratio while improving image performance. Thus, the bulk and size of the entire lens system is not easily kept within manageable proportions.

Photographic zoom lenses are generally required to be quickly and easily manageable. In this respect, the compactness of the lens system as a whole constitutes an important factor. However, in many cases, as the entire lens system is made more compact, the optical performance tends to deteriorate. This is also valid with respect to the aforementioned types of zoom lenses.

Attempts have been made to reduce the size of zoom lens of the above-described type by shortening the total movement of the second lens group so that the size of the varifocal section is reduced, and by intensifying the telephoto nature of the fourth lens group. This shortening of the physical length of the entire lens system causes decrease of the front group of the lens system. This makes the zoom lens compact. However, to achieve the shortening of the total movement of the second lens group and therefore the length of the varifocal section, it is necessary to strengthen the refractive power of the first and third lens groups. As the refractive power of each of the lens groups increases, the chromatic aberrations produced in the telephoto position and the variations of field curvature and astigmatism with zooming, become more difficult to correct. Accordingly, there is a limitation on the degree of strenthening of the refractive power. Also, when the fourth lens group is of the telephoto effect-increased type, the Petzval sum decreases, therefore tending to increase the Petzval sum of the entire lens system in the negative sense. This lowers the imaging performance, therefore, both intensifying the telephoto effect and strengthening the refractive power produce disadvantages.

Examples of four group type zoom lens with attempts to improve imaging performance are disclosed in U.S. Pat. Nos. 4,025,167 and 4,189,213.

SUMMARY OF THE INVENTION

It is an object of the present invention to provide a compact zoom lens of which the telephoto ratio in the telephoto zooming position is suppressed to about 0.9, and which is well corrected for aberrations throughout the entire zooming range.

The zoom lens of the invention is of a similar form to that of the above-described type zoom lens, having four lens groups with the first lens group of positive power counting from the front being movable for focusing, the second and third lens groups of negative and positive powers respectively being movable for zooming, and the fourth lens group forming an image of an object, whereby the one-way axial movement of the second lens group causes the variation in focal length of the entire lens system, while the image shift compensation is effected by the reciprocating axial movement of the third lens group in a path concave toward the front.

One of the features of the invention is that the first lens group is constructed with two positive lenses and one negative lens, and the third lens group with one positive lens and one negative lens, the form of each lens and the choice of a glass in each lens being so appropriate that good correction of chromatic aberrations in the telephoto positions and a great advantage of compactness of the entire zoom lens system are achieved.

BRIEF DESCRIPTION OF THE DRAWINGS

FIGS. 5A-1 to 3, FIGS. 5B-1 to 3 and FIGS. 5C-1 to 3 are graphic representations of the aberrations of embodiment 1.

FIGS. 6A-1 to 3, FIGS. 6B-1 to 3 and FIGS. 6C-1 to 3 are graphic representations of the aberrations of embodiment 2.

FIGS. 7A-1 to 3, FIGS. 7B-1 to 3 and FIGS. 7C-1 to 3 are graphic representations of the aberrations of embodiment 3.

FIGS. 8A-1 to 3, FIGS. 8B-1 to 3 and FIGS. 8C-1 to 3 are graphic representations of the aberrations of embodiment 4.

DETAILED DESCRIPTION OF THE PREFERRED EMBODIMENTS

Figure 1:
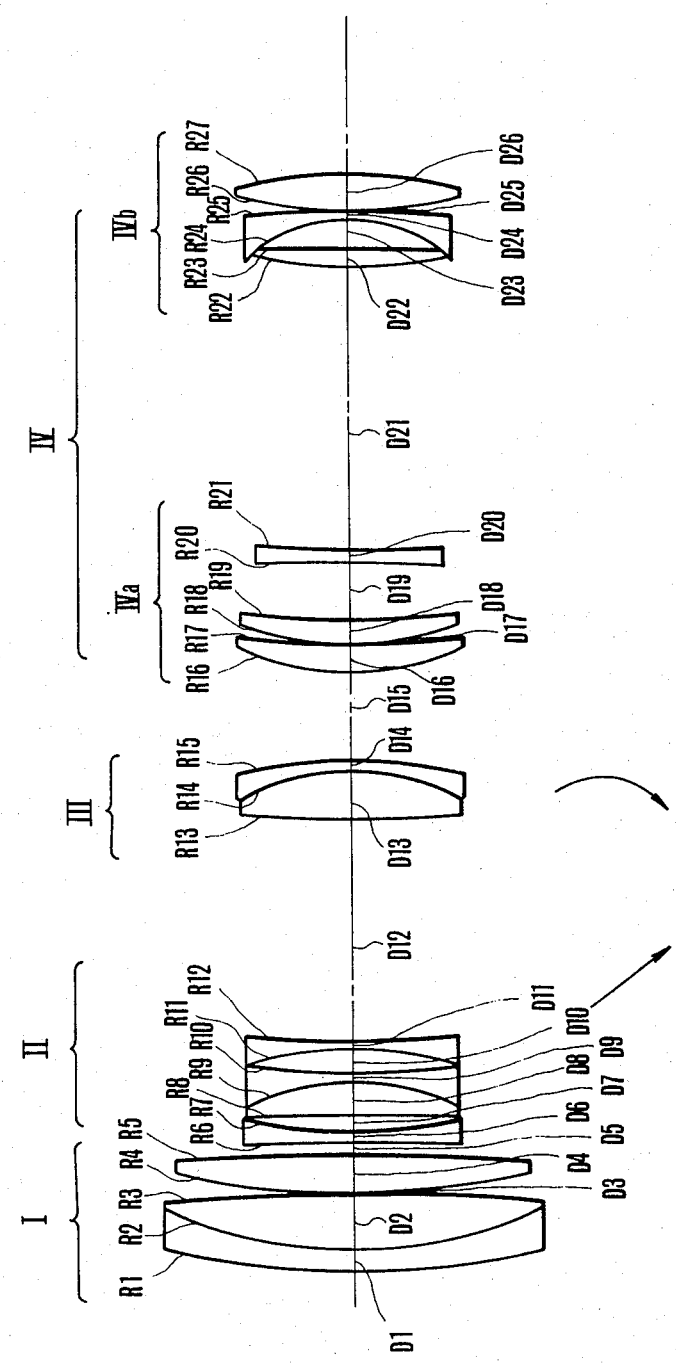
FIGS. 1 to 4 are lens block diagrams of respective embodiments 1 to 4 of the present invention.
Figure 2:
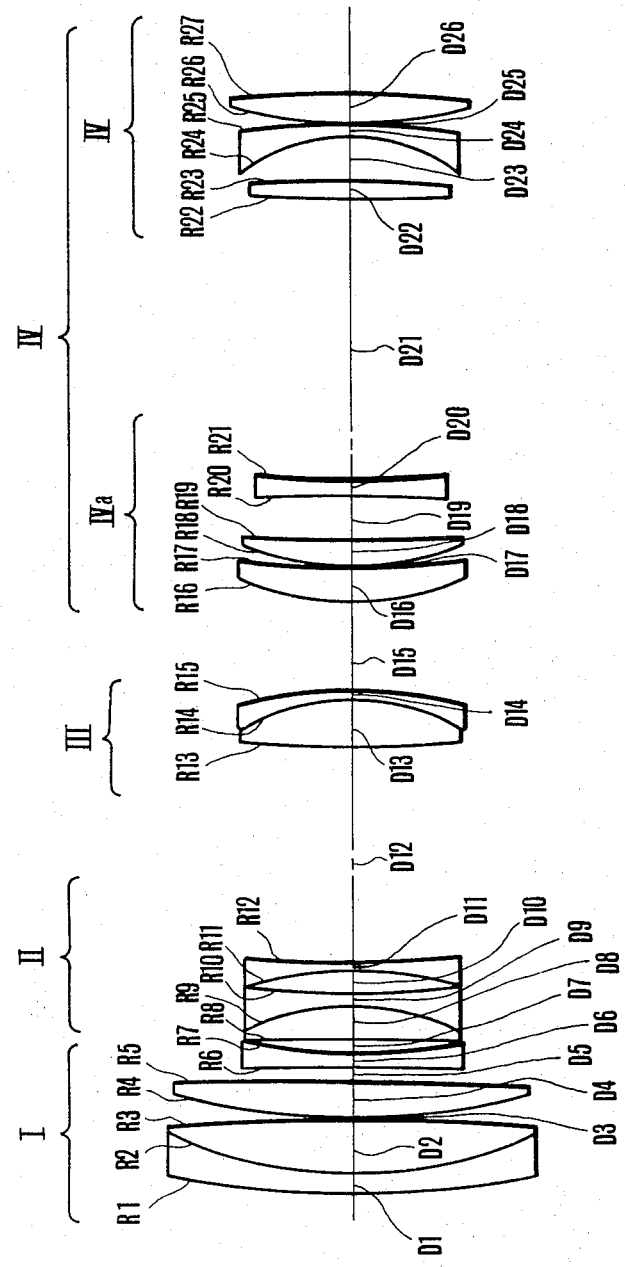
Figure 3:
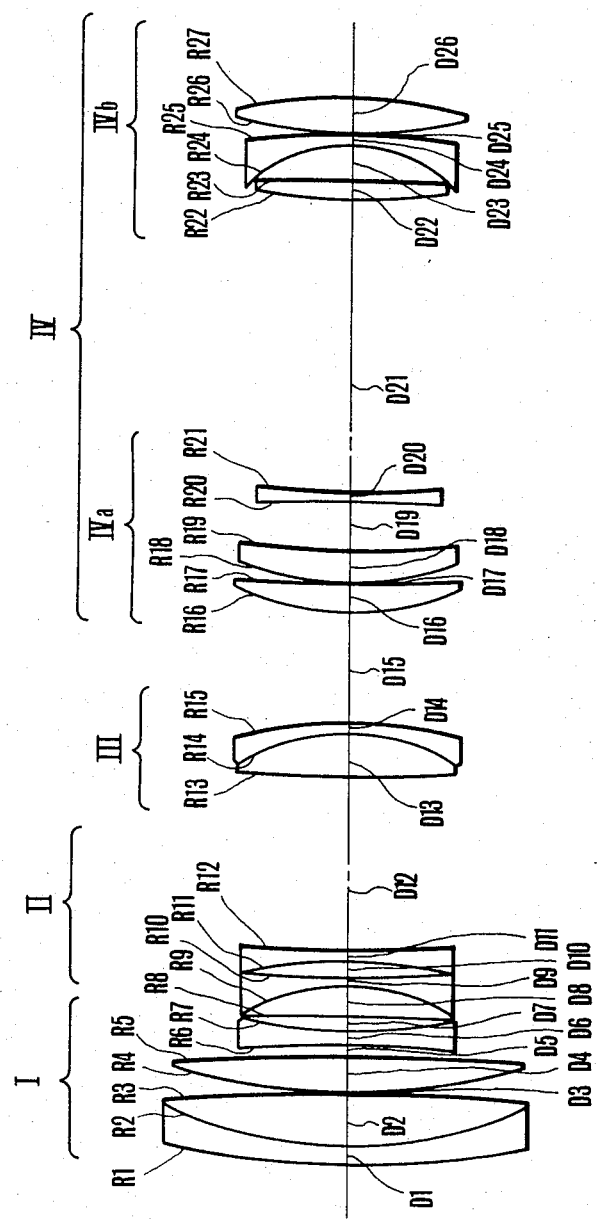
Figure 4:
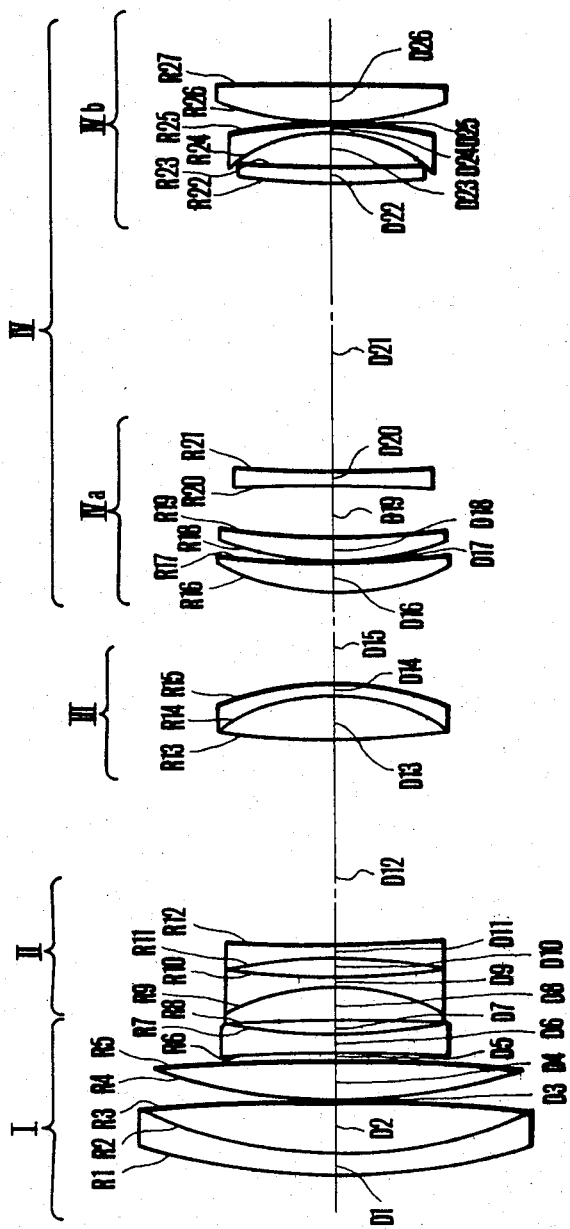

The present invention is described in a greater detail in connection with embodiments thereof. As regards the construction of each of the lens group, the first lens group counting from the front is composed of a positive doublet of a negative element and a positive element cemented together, and a positive signlet, the second lens group composed of of a negative singlet, a negative doublet of a positive element and a negative element cemented together, and a negative singlet, the third lens group is composed of a positive doublet of a positive element and a negative element cemented together, and the fourth lens group includes a front part of positive power and a rear part of negative power, the front part includes of two positive singlets with their front surfaces convex toward the front and one negative singlet and the rear part composed of a positive singlet, a negative singlet with its front surface concave toward the front, and a positive singlet. By choosing the glasses in the first and third lens groups in accordance with invention sets forth the following conditions with the advantage of achieving a still further minimization of the bulk and size of the zoom lens whilst a high standard of aberration correction is maintained throughout the increased zooming range.

Here letting $\nu 23$ denote the average value of the Abbe numbers of the two positive lens elements in the 1st lens group, and $\nu 1$ the Abbe number of the negative lens element in the 1st lens group, defining the partial dispersion ratio $\theta$ of an optical glass by $\theta = (ng-nd)/(nF-nC)$ where ng, nF, nd and nC are the refractive indices of the glass for the Fraunhofer g-line, F-line, d-line and C-line respectively, $\theta_{23}$ denote the average value of the partial dispersion ratios of the two positive lens elements in the 1st group, and $\theta_1$ the partial dispersion ratio of the negative lens element in the 1st group, and letting $\nu_8$ and $\nu_9$ denote the Abbe numbers of the positive and negative lens elements in the 3rd group respectively, and $\theta_8$ and $\theta_9$ the partial dispersion ratios of these lens elements respectively. Lenses embodying the invention exhibit the following conditions.

(1) $72 < \nu_{23} < 95.1$
(2) $1 \times 10^{-3} < (\theta_1 - \theta_{23})/(\nu_{23} - \nu_1) < 2 \times 10^{-3}$
(3) $0.9 \times 10^{-3} < (\theta_9 - \theta_8)/(\nu_8 - \nu_9) < 2.3 \times 10^{-3}$ Upon satisfaction of conditions (1) to (3), the range of variation of the chromatic aberrations with zooming is suppressed to a minimum. This affords the additional advantage that the good stabilization of the other aberrations can be facilitated and in its turn a great advance in the compactness of the lens system can be achieved. Particularly the longitudinally chromatic aberration which would be otherwise objectionable when zoomed in the telephoto position is well corrected. This contributes an improvement of the imaging performance in the telephoto region.

When the lower limit of condition (1) is exceeded, the radius of curvature of the 2nd lens surface in the 1st group becomes so small that the variation caused by zooming, of the chromatic aberrations particularly regarding the color spherical aberration and color comatic aberration is difficult to correct. The upper limit represents the marginal value for materials available on the market as the optical glass at the present time. Conditions (2) and (3) are for a minimization of the secondary chromatic aberrations. In the zoom lens of the telephoto type, it is of importance to suppress the secondary chromatic aberrations in the telephoto positions to a minimum. If the secondary chromatic aberrations are large, the imaging performance deteriorates substantially when zoomed to the telephoto positions. To avoid this, it is necessary to select a combination of glasses in the positive and negative lens elements so as to minimize the value of $(\theta_- - \theta_+)/(\nu_+ - \nu_-)$ where $\theta_+$ and $\theta_-$ are the partial dispersion ratios of the glasses in the positive and negative lens elements, and $\nu_+$ and $\nu_-$ the Abbe numbers of these glasses respectively. Conditions (2) and (3) represent the tolerance of combinations of glasses for that purpose. When the upper limits of conditions (2) and (3) are exceeded, the secondary chromatic aberrations become large in the telephoto region. When the lower limits are exceeded, the difference between the refractive indices of the negative and positive lens elements at the cemented surface becomes so large that the spherical aberration varies to large extent when zooming and its correction becomes difficult.

Although, as will be seen from the foregoing, the embodiments of zoom lenses according to the present invention within the framework of the general requirements (1) to (3) provide a much-desired reduction in the bulk and size of the entire lens system, while still maintaining good stability of aberration throughout the zooming range, a further improvement in the degree of correction is possible by adhering to the following specific requirements.

Here the refractive indices for spectral d-line of the three negative lens elements in the 2nd group are denoted by $n_4$, $n_6$ and $n_7$ for the elements numbered from the front.

In the 4th group, the refractive index for the spectral d-line of the 1st positive singlet counting from the front in the front part is denoted by $n_{10}$ and its Abbe number by $\nu_{10}$, the Abbe number of the 2nd positive singlet by $\nu_{11}$, the refractive index for the spectral d-line of the negative singlet in the front part by $n_{12}$ and its Abbe number by $\nu_{12}$, and the refractive index for the spectral d-line of the negative singlet in the rear part by $n_{14}$.

Further, the shortest focal length of the zoom lens is denoted by $f_w$, the focal lengths of the 2nd and 4th lens groups by $f_2$ and $f_4$ respectively, and the overall focal length of the two positive singlets in the front part of the 4th group by $f_{492}$.

Then, we have (4) $-0.45 f_w < f_2 < -0.36 f_w$
(5) $1.68 < n_4 < 1.883$
(6) $1.68 < n_6 < 1.883$
(7) $1.68 < n_7 < 1.883$
(8) $0.45 f_4 < f_{492} < 0.6 f_4$
(9) $1.464 < n_{10} < 1.5$
(10) $1.75 < n_{12} < 1.85$
(11) $1.75 < n_{14} < 1.85$
(12) $70 < \nu_{10} < 95.1$
(13) $27 < (\nu_{10} + \nu_{11})/2 - \nu_{12} < 37$ Here the reason of having the above-described various conditions is as follows. Conditions (4) to (7) concern the power distribution of the varifocal section, and the refractive indices of the glasses therein, and are for making the varifocal section compact and suppressing the variation of aberrations with zooming to a minimum. Also condition (8) concerns with the power distribution over the front part in the 4th group. Conditions (9) to (13) are for compensating for the deterioration of aberrations resulting from the determination of the power distribution over the 4th group under condition (8) and maintaining good stability of aberration correction throughout the zooming range.

In the following, each of the conditions is explained in greater detail. Conditions (4) to (7) represent the refractive power of the 2nd lens group and the refractive indices of the glasses in that group. As regards condition (4), the excess of $f_2$ above the upper limit is rather advantageous in the aberration correction, but causes the total movement of the varifocal section to be increased and also the focal length of the 4th group to be lengthened. As a result, the physical length of the lens system is increased, and this is incompatible with compactness. When the lower limit is exceeded, the Petzval sum of the entire lens system is increased in the negative sense so that over-correction of field curvature results and the variation of astigmatism increases. Also, color chromatic aberration is caused in the telephoto region, and the variation with zooming of spherical aberration becomes objectionably large. And, if the lower limit of condition (4) is violated, even when conditions (5) to (7) prevail, it is difficult to achieve good correction of aberrations over the entire zooming range. Conditions (5) to (7) concern the Petzval sum of the 2nd lens group. Since the shortening of the focal length of the 2nd lens group under condition (4) results in the increase of the Petzval sum in the negative sense, this is compensated for by increasing the refractive indices of the three negative singlets. Below the lower limits of conditions (5) to (7), disadvantageous over-correction of field curvatuve results. The upper limit represents the marginal value for the glasses available at the present time in the market.

Condition (8) concerns the power distribution over the 4th lens group and is for making the 4th lens group of the telephoto type with the advantage of shortening the total length. An excess of the factor in condition (8) above its upper limit is rather advantageous for aberration correction, but causes the physical length of the zoom lens to be increased, this being incompatible with the advantage of compactness. When the lower limits are exceeded, a remarkable amount of spherical aberration is produced, thus causing under-correction of the spherical aberration in the entire zooming range. And, if the lower limit of condition (8) is violated, even when conditions (9) to (13) are given, it becomes difficult to achieve good correction of aberrations over the entire zooming range.

Conditions (9) to (11) concern the Petzval sum of the 4th lens group. Since the Petzval sum increases in the negative sense when the 4th lens group is made to be of the telephoto type under condition (8), this is compensated for by lowering the refractive index of the positive lens and heightening the refractive index of the negative lens. When the upper limit of condition (9), or the lower limit of conditions (10) and (11) is exceeded, the Petzval sum increases in the negative sense and over-correction of field curvature results. The lower limit of condition (9) represents the marginal value for the glasses available at the present time in the market. Also the upper limit of conditions (10) and (11) represents the boundary for the possibility of achromatization of the 4th lens group and the marginal value for the glasses available at the present time.

Conditions (12) and (13) serve for good correction of chromatic aberrations particularly regarding the longitudinal chromatic aberration. When the lower limits of conditions (12) and (13) are exceeded, longitudinal chromatic aberration is under-corrected. When the upper limit of condition (13) is exceeded, longitudinal chromatic aberration is over-corrected. The upper limit of condition (12) represents the marginal value for the glasses available at the present time.

Next, practical embodiments of the invention are illustrated. Embodiment 1 provides a range of focal lengths f=81.4 to 194.2, embodiment 2 a range of focal length f=81.4 to 195.1, embodiment 3 a range of focal lengths f=81.4 to 195, and embodiment 4 a range of focal lengths f=81.4 to 196.8, and the F-number is 4 in any case. In the embodiments, Ri is the radius of curvature of the i-th lens surface counting from the front, Di is the axial thickness or air separation between the i-th and (i+1)th surfaces, and Ni and $\nu$i are the refractive index and Abbe number of the glass from which the i-th lens elements counting from the front is made up respectively.

The longitudinal sections of the lenses of embodiments 1 to 4 and their aberrations are illustrated in the respective drawings where I, II, III and IV denote the 1st lens group, the 2nd lens group, the 3rd lens group and the 4th lens group respectively, IVa and IVb denote the front and rear parts of the 4th lens group respectively, and the arrows indicate the paths of movement of the zoom groups. Further, M designates the meridional focus line and S the sagittal focus line.

| Embodiment 1 | | | | | |
|---|---|---|---|---|---|
| f = 81.4–194.2  F-number = 4.0 | | | | | |
| R1 | 111.84 | D1 | 2.80 | N1 | 1.72825 $\nu1 = 28.5$ |
| R2 | 62.77 | D2 | 7.21 | N2 | 1.49700 $\nu2 = 81.6$ |
| R3 | −758.00 | D3 | 0.16 | | |
| R4 | 96.72 | D4 | 5.30 | N3 | 1.49831 $\nu3 = 65.0$ |
| R5 | −877.93 | D5 | Variable | | |
| R6 | −2,966.17 | D6 | 1.59 | N4 | 1.71300 $\nu4 = 53.9$ |
| R7 | 74.00 | D7 | 2.12 | | |
| R8 | −398.95 | D8 | 4.56 | N5 | 1.80518 $\nu5 = 25.4$ |
| R9 | −36.16 | D9 | 1.59 | N6 | 1.69680 $\nu6 = 55.5$ |
| R10 | 200.51 | D10 | 2.55 | | |
| R11 | −54.81 | D11 | 1.59 | N7 | 1.69680 $\nu7 = 55.5$ |
| R12 | 348.75 | D12 | Variable | | |
| R13 | 168.68 | D13 | 6.36 | N8 | 1.61800 $\nu8 = 63.4$ |
| R14 | −33.68 | D14 | 1.50 | N9 | 1.75520 $\nu9 = 27.5$ |
| R15 | −67.15 | D15 | Variable | | |
| R16 | 36.91 | D16 | 3.61 | N10 | 1.49700 $\nu10 = 81.6$ |
| R17 | 109.76 | D17 | 2.95 | | |
| R18 | 46.80 | D18 | 4.93 | N11 | 1.56873 $\nu11 = 63.1$ |
| R19 | 120.01 | D19 | 3.22 | | |
| R20 | −39.351 | D20 | 1.50 | N12 | 1.83400 $\nu12 = 37.2$ |
| R21 | 145.18 | D21 | 38.33 | | |
| R22 | 86.55 | D22 | 2.30 | N13 | 1.60342 $\nu13 = 38.0$ |
| R23 | −851.34 | D23 | 3.57 | | |
| R24 | −23.19 | D24 | 1.50 | N14 | 1.77250 $\nu14 = 49.6$ |
| R25 | −178.28 | D25 | 0.15 | | |
| R26 | 70.73 | D26 | 4.50 | N15 | 1.60562 $\nu15 = 43.7$ |
| R27 | −95.86 | | | | |

| Lens Separations with Zooming | | | |
|---|---|---|---|
| f | 81.4 | 122.4 | 194.2 |
| D5 | 1.65 | 22.38 | 37.65 |
| D12 | 29.52 | 19.62 | 2.23 |
| D15 | 12.00 | 1.17 | 3.29 |

$f_2 = -35 = -0.430 f_w$
$f_4 = 117.4$
$f_{4\text{\it{a}}2} = 59.97 = 0.51 f_4$
$\theta_1 = 1.315$
$\theta_{23} = 1.278$
$\theta_8 = 1.240$
$\theta_9 = 1.316$

| Embodiment 2 | | | | | |
|---|---|---|---|---|---|
| f = 81.4–195.1  F-number = 4.0 | | | | | |
| R1 | 132.88 | D1 | 2.64 | N1 | 1.68893 $\nu1 = 31.1$ |
| R2 | 65.45 | D2 | 6.80 | N2 | 1.49700 $\nu2 = 81.6$ |
| R3 | −399.13 | D3 | 0.20 | | |
| R4 | 85.28 | D4 | 5.00 | N3 | 1.49700 $\nu3 = 81.6$ |
| R5 | −1,787.93 | D5 | Variable | | |
| R6 | 816.44 | D6 | 2.20 | N4 | 1.77250 $\nu4 = 49.6$ |
| R7 | 80.11 | D7 | 1.50 | | |
| R8 | −567.43 | D8 | 4.30 | N5 | 1.84666 $\nu5 = 23.9$ |
| R9 | −39.29 | D9 | 2.00 | N6 | 1.69680 $\nu6 = 55.5$ |
| R10 | 122.18 | D10 | 2.58 | | |
| R11 | −50.42 | D11 | 1.50 | N7 | 1.69680 $\nu7 = 55.5$ |
| R12 | 234.59 | D12 | Variable | | |
| R13 | 142.09 | D13 | 6.05 | N8 | 1.61800 $\nu8 = 63.4$ |
| R14 | −32.61 | D14 | 1.50 | N9 | 1.75520 $\nu9 = 27.5$ |
| R15 | −67.37 | D15 | Variable | | |
| R16 | 39.10 | D16 | 4.80 | N10 | 1.48749 $\nu10 = 70.0$ |
| R17 | 132.25 | D17 | 0.15 | | |
| R18 | 46.97 | D18 | 3.10 | N11 | 1.56873 $\nu11 = 63.1$ |
| R19 | 156.78 | D19 | 6.13 | | |
| R20 | −638.97 | D20 | 2.00 | N12 | 1.83400 $\nu12 = 37.2$ |
| R21 | 104.99 | D21 | 37.56 | | |
| R22 | 178.50 | D22 | 2.60 | N13 | 1.60342 $\nu13 = 38.0$ |
| R23 | −123.05 | D23 | 5.87 | | |
| R24 | −24.02 | D24 | 1.50 | N14 | 1.77350 $\nu14 = 49.6$ |
| R25 | −111.39 | D25 | 0.15 | | |
| R26 | 66.12 | D26 | 3.50 | N15 | 1.60562 $\nu15 = 43.7$ |
| R27 | −221.28 | | | | |

| Lens Separations with Zooming | | | |
|---|---|---|---|
| f | 81.4 | 125.4 | 195.1 |
| D5 | 1.60 | 22.33 | 36.20 |
| D12 | 28.56 | 18.78 | 3.14 |

Embodiment 2 -continued

| D15 | 12.00 | 1.05 | 2.82 |
|---|---|---|---|

$f_2 = -33 = -0.405fw$
$f_4 = 113.97$
$f_{492} = 58.13 = 0.51f_4$
$\theta_1 = 1.303$
$\theta_{23} = 1.232$
$\theta_8 = 1.240$
$\theta_9 = 1.316$

Embodiment 3
f = 81.4–195  F-number = 4.0

| | | | | | |
|---|---|---|---|---|---|
| R1 | 117.90 | D1 | 2.50 | N1 | 1.68893 $\nu1 = 31.1$ |
| R2 | 59.00 | D2 | 7.00 | N2 | 1.49700 $\nu2 = 81.6$ |
| R3 | −422.96 | D3 | 0.10 | | |
| R4 | 84.54 | D4 | 4.80 | N3 | 1.48749 $\nu3 = 70.1$ |
| R5 | −786.42 | D5 | Variable | | |
| R6 | −278.40 | D6 | 2.00 | N4 | 1.71300 $\nu4 = 53.8$ |
| R7 | 72.04 | D7 | 1.82 | | |
| R8 | −243.18 | D8 | 3.90 | N5 | 1.80518 $\nu5 = 25.4$ |
| R9 | −31.11 | D9 | 1.50 | N6 | 1.69680 $\nu6 = 55.5$ |
| R10 | 195.65 | D10 | 2.35 | | |
| R11 | −54.57 | D11 | 1.36 | N7 | 1.69680 $\nu7 = 55.5$ |
| R12 | 249.92 | D12 | Variable | | |
| R13 | 150.69 | D13 | 5.90 | N8 | 1.61800 $\nu8 = 63.4$ |
| R14 | −31.34 | D14 | 1.50 | N9 | 1.75520 $\nu9 = 27.5$ |
| R15 | −59.25 | D15 | Variable | | |
| R16 | 37.91 | D16 | 3.82 | N10 | 1.49700 $\nu10 = 81.6$ |
| R17 | 181.54 | D17 | 0.10 | | |
| R18 | 44.34 | D18 | 4.32 | N11 | 1.56873 $\nu11 = 63.1$ |
| R19 | 118.75 | D19 | 6.68 | | |
| R20 | −283.55 | D20 | 1.50 | N12 | 1.83400 $\nu12 = 37.2$ |
| R21 | 111.90 | D21 | 39.18 | | |
| R22 | 95.61 | D22 | 2.31 | N13 | 1.60342 $\nu13 = 38.0$ |
| R23 | −2,764.08 | D23 | 4.93 | | |
| R24 | −22.43 | D24 | 1.50 | N14 | 1.77250 $\nu14 = 49.6$ |
| R25 | −102.51 | D25 | 0.10 | | |
| R26 | 78.11 | D26 | 4.53 | N15 | 1.60562 $\nu15 = 43.7$ |
| R27 | −79.18 | | | | |

Lens Separations with Zooming

| f | 81.4 | 127.4 | 195. |
|---|---|---|---|
| D5 | 1.54 | 22.27 | 35.34 |
| D12 | 22.65 | 14.25 | 1.61 |
| D15 | 15.00 | 2.67 | 2.24 |

$f_2 = -30.02 = -0.369fw$
$f_4 = 105.62$
$f_{492} = 54.00 = 0.51f_4$
$\theta_1 = 1.303$
$\theta_{23} = 1.227$
$\theta_8 = 1.240$
$\theta_9 = 1.316$

Embodiment 4
f = 81.4–196.8  F-number = 4.0

| | | | | | |
|---|---|---|---|---|---|
| R1 | 104.11 | D1 | 2.64 | D1 | 1.68893 $\nu1 = 31.1$ |
| R2 | 63.30 | D2 | 6.80 | D2 | 1.43387 $\nu2 = 95.1$ |
| R3 | −380.35 | D3 | 0.20 | | |
| R4 | 78.87 | D4 | 5.00 | D3 | 1.43387 $\nu3 = 95.1$ |
| R5 | −1,005.03 | D5 | Variable | | |
| R6 | −263.32 | D6 | 2.20 | D4 | 1.71300 $\nu4 = 53.8$ |
| R7 | 83.88 | D7 | 2.00 | | |
| R8 | −284.79 | D8 | 4.30 | D5 | 1.80518 $\nu5 = 25.4$ |
| R9 | −35.37 | D9 | 2.00 | D6 | 1.69680 $\nu6 = 55.5$ |
| R10 | 190.31 | D10 | 2.58 | | |
| R11 | −61.07 | D11 | 1.50 | D7 | 1.69680 $\nu7 = 55.5$ |
| R12 | 282.97 | D12 | Variable | | |
| R13 | 102.91 | D13 | 6.04 | D8 | 1.43387 $\nu8 = 95.1$ |
| R14 | −28.20 | D14 | 1.42 | D9 | 1.63980 $\nu9 = 34.5$ |
| R15 | −44.63 | D15 | Variable | | |
| R16 | 36.55 | D16 | 3.88 | D10 | 1.49700 $\nu10 = 81.6$ |
| R17 | 122.83 | D17 | 0.10 | | |
| R18 | 47.28 | D18 | 3.30 | D11 | 1.56873 $\nu11 = 63.1$ |
| R19 | 120.59 | D19 | 6.73 | | |
| R20 | −340.09 | D20 | 2.00 | D12 | 1.83400 $\nu12 = 37.2$ |
| R21 | 138.08 | D21 | 37.98 | | |
| R22 | 109.04 | D22 | 2.30 | D13 | 1.60342 $\nu13 = 38.0$ |
| R23 | −3,588.19 | D23 | 4.30 | | |
| R24 | −22.62 | D24 | 1.50 | D14 | 1.77250 $\nu14 = 49.6$ |
| R25 | −63.89 | D25 | 0.20 | | |
| R26 | 59.64 | D26 | 4.53 | D15 | 1.60562 $\nu15 = 43.7$ |
| R27 | −1,540.59 | | | | |

Lens Separations during Zooming

| f | 81.4 | 125.4 | 196.8 |
|---|---|---|---|
| D5 | 1.36 | 22.03 | 36.10 |
| D12 | 72.39 | 17.59 | 1.55 |
| D15 | 12.50 | 1.57 | 3.54 |

$f_2 = -33.0 = -0.405fw$
$f_4 = 115.44$
$f_{492} = 59.00 = 0.51f_4$
$\theta_1 = 1.303$
$\theta_{23} = 1.232$
$\theta_8 = 1.232$
$\theta_9 = 1.295$

What is claimed is:

1. A compact zoom lens comprising, from front to rear:
    a first lens group of positive refractive power having one negative lens and two positive lenses and being movable for focusing;
    a second lens group having a negative refractive power;
    a third lens group of positive refractive power having one positive lens and one negative lens;
    variation of image magnification being effected by the second and third lens groups; and
    a fourth lens group of positive refractive power constituting an image forming section;
    the first lens group having, from front to rear, a positive lens consisting of a negative lens and a positive lens cemented together, and a positive lens, the second lens group having, from front to rear, a negative lens, a negative lens consisting of a positive lens and a negative lens cemented together, and a negative lens, and the third lens group having a positive lens consisting of a positive lens and a negative lens cemented together,
    letting $\nu_{23}$ denote the average value of the Abbe numbers of the two positive lenses in the first lens group, $\nu_1$ the Abbe number of the negative lens in the first lens group, the partial dispersion ratio $\theta = (ng-nd)/(nF-nC)$ where ng, nF, nd and nC are the refractive indices for the Fraunhofer g-line, F-line, d-line and C-line respectively, letting $\theta_{23}$ denote the average value of the partial dispersion ratios of the two positive lenses in the first lens group, $\theta$ the partial dispersion ratio of the negative lens in the first lens group, and letting $\nu8$, $\nu9$, $\theta8$ and $\theta9$ be the Abbe numbers and partial dispersion ratios of the positive and negative lenses in the third lens group respectively,
    and letting f2 represent the focal length of the second lens group, fw the shortest focal length of the zoom lens system, n4, n6 and n7 the refractive incides for the spectral d line of the first to the third of the three negative lenses in the second lens group counting from the front respectively, so that when the second lens group is moved axially and at the same time the third lens group is moved so as to describe a path concave toward the front to effect zooming,
    then the relations $72 < \nu_{23} \leq 95.1$
$1 \times 10^{-3} < (\theta_1 - \theta_{23})/(\nu_{23} - \nu_1) < 2 \times 10^{-3}$
$0.9 \times 10^{-3} < (\theta_9 - \theta_8)/(\nu_8 - \nu_9) < 2.3 \times 10^{-3}$
$-0.45 f_w < f_2 < -0.36 f_w$
$1.68 < n_4 < 1.883$
$1.68 < n_6 < 1.883$
$1.68 < n_7 < 1.883$
are satisfied.

2. A compact zoom lens according to claim 1, wherein the fourth lens group has a front part of positive refractive power and a rear part of negative refractive power, the front part having, from front to rear, two positive lenses with their front surfaces convex toward the front and one negative lens, and the rear part having, front front to rear, a positive lens, a negative lens with its front surface concave toward the front and a positive lens, and wherein letting f4 equal the focal length of the fourth lens group, $f_{492}$ the overall focal length of the two positive lenses in the front part of the fourth lens group, $n_{10}$ the refractive index of the first positive lens in the front part, $\nu_{10}$ the Abbe number thereof, $\nu_{11}$ the Abbe number of the second positive lens, $n_{12}$ the refractive index of the negative lens in the front part, and $n_{14}$ the refractive index of the negative lens in the rear part of the fourth lens group, the relations $0.45 f_4 < f_{492} < 0.6 f_4$
$1.464 < n_{10} < 1.5$
$1.75 < n_{12} < 1.85$
$1.75 < n_{14} < 1.85$
$70 < \nu_{10} < 95.1$
$27 < (\nu_{10} + \nu_{11})/2 - \nu_{12} < 37$
are satisfied.

* * * * *